United States Patent [19]
Ringer

[11] 3,747,653
[45] July 24, 1973

[54] RECEPTACLE FOR LAWN DEBRIS

[75] Inventor: Charles Judd Ringer, Wayzata, Minn.

[73] Assignee: Judd Ringer Corporation, Eden Prairie, Minn.

[22] Filed: Oct. 2, 1972

[21] Appl. No.: 294,089

[52] U.S. Cl. .................. 150/1, 15/257.1, 150/2, 150/49, 248/99
[51] Int. Cl. ............................................. B65d 77/00
[58] Field of Search .................... 150/1, 1.5 B, 2, 150/49, DIG. 1; 229/53; 135/1 R, 3 R; 5/343; 56/202; 15/257.1; 248/95, 99

[56] References Cited
UNITED STATES PATENTS

| | | | |
|---|---|---|---|
| 3,697,030 | 10/1972 | Schultz | 15/257.1 |
| 3,257,090 | 6/1966 | Frazier | 229/53 |
| 1,581,888 | 4/1926 | Thomas | 150/49 |
| 1,228,333 | 5/1917 | McBurney | 248/99 |
| 422,274 | 2/1890 | Wilkinson | 248/98 |

Primary Examiner—Samuel B. Rothberg
Assistant Examiner—Alex Eskenas
Attorney—Frederick E. Lange et al.

[57] ABSTRACT

A self-supporting receptacle for collecting lawn debris in which there is a triangular frame of rod material, a bag secured to said frame with the frame maintaining the opening of the bag extended, and a prop rod movably supported with respect to the frame. Specifically, the prop rod is supported in a sleeve of the bag running lengthwise of the bag from adjacent the opening. A handle member is secured to the frame for transporting the receptacle. The frame is sufficiently bendable that the legs of the triangular frame can be bent together for shipping and storage purposes.

9 Claims, 6 Drawing Figures

PATENTED JUL 24 1973

3,747,653

RECEPTACLE FOR LAWN DEBRIS

BACKGROUND OF THE INVENTION

The collection and disposal of lawn debris such as leaves, twigs and grass cuttings has become an increasingly greater problem in recent years. In the case of leaves, these were customarily raked and burned. Many communities now have laws prohibiting such burning. As a result, there has been a tendency towards increased use of plastic bags for collecting such lawn debris. Many of these bags, however, are not biodegradable and the use of them is accordingly being criticized. At the same time, there is an increasing recognition of the value of organic compost and, as a result, there is a greater use of compost makers. There is also an increasing use of shredders to either aid in the compost action or to reduce the volume of the lawn debris so that it is more compact and can be more easily hauled away.

Regardless of whether the lawn debris is being taken to a compost heap or to a shredder, it is helpful to have a relatively large light container into which the lawn debris may be raked and transported. In the past, it has been proposed to provide a large bag of some material such as burlap and secure this to a rectangular frame having lower extending legs which can be forced into the ground to maintain the frame upright while the leaves are being raked into it. Such an arrangement has a drawback that it is often difficult to force the feed into the ground sufficiently far to bring the lower portion of the frame in contact with the ground. If it is not possible to force the feet of the frame down this much because of the ground being hard or because of the presence of a rock beneath the surface, the frame will be unstable. Moreover, the lower edge of the frame will be spaced from the ground and part of the leaves or other lawn debris will go beneath the frame. Furthermore, when the sack is full it is necessary to pull the feet of the frame out of the ground and this can lead to spillage of some of the contents.

SUMMARY OF THE PRESENT INVENTION

The present invention is concerned with a self-supporting receptacle for collecting lawn debris in which there is a frame formed of rod material to which the open end of a bag is secured and in which there is a prop rod of a length greater than the verticle height of the frame and movably secured with respect to the frame with one end of the rod adjacent to the upper portion of the frame so that the rod acts as a prop to hold the frame close to a vertical position to enable the lawn debris to be readily introduced into the bag without lifting the debris. More specifically, the bag is provided with an inner sleeve extending lengthwise thereof, the prop rod being movably supported with respect to the frame by being disposed in the sleeve. The sleeve is preferably closed at its inner end and has an open end adjacent the opening of the bag so that the prop rod can be withdrawn. While the invention is not necessarily so limited, I have found it desirable to employ a frame having three sections disposed so as to define a triangular opening with the base of the triangle designed to rest on the ground.

It is very desirable to have such a receptacle easily manipulable when filled and in my receptacle, one of the sections of the frame is formed to provide a handle for grasping the frame and readily moving the receptacle. Where a triangular frame is used, the upper portion of the sleeve supporting the prop rod terminates adjacent the upper corner of the triangle.

In order for the device to be readily folded for storing and shipping purposes, the sections of the frame are preferably bendable with respect to each other. This, along with the withdrawal of the prop rod, enables the device to be folded into a rather compact unit.

In order to reduce the weight of the bag and hence make it easier to transport, I employ a lightweight mesh of a plastic material such as nylon. Such a material also tends to resist mildew.

Further objects of the present invention will be apparent from the consideration of the accompanying specification, claims and drawing.

DESCRIPTION OF THE PREFERRED EMBODIMENT

Figure 1:
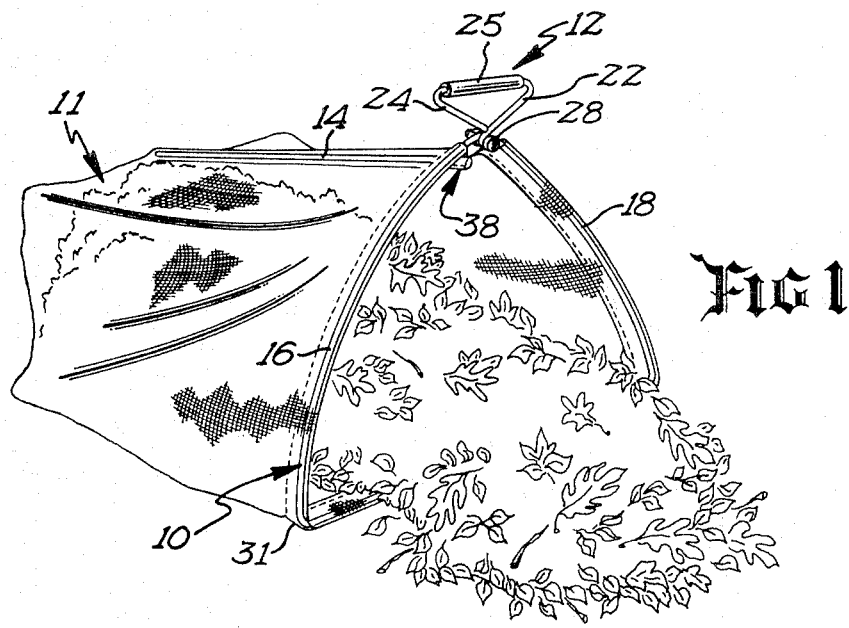
FIG. 1 is a perspective view showing my receptacle in the position it assumes when substantially full of leaves.

Referring first to FIG. 1 which, as previously indicated, shows the receptacle in the condition it assumes when it is substantially full of leaves, this receptacle is shown as comprising a frame 10 and a bag 11 secured to the frame. Secured to the upper portion of the frame and forming a continuation thereof is a handle 12. In the condition shown in FIG. 1, there is no particular problem with regard to supporting the frame 10 since the receptacle is so full of leaves that it tends to support itself. Where, however, the sack is substantially empty as in FIGS. 2, 3 and 4, it is necessary to have some convenient means of supporting the frame in a vertical position. This is accomplished by a prop rod 14 which is of a length greater than the vertical height of the frame 10 and which is loosely connected to the frame 10. As shown best in FIG. 2, this prop rod 14 acts to hold the frame in a substantially vertical position when the receptacle is empty. As leaves or other lawn debris are placed within the receptacle, the inner end of the prop rod 14 is forced upwardly away from the ground. This simply results in the lower end of the prop rod being at a higher elevation. The prop rod still continues, however, to hold the frame 10 in an upright position until the bag 11 becomes so full that the contents thereof tend to make the bag sufficiently stiff that it will hold up the frame 10. This is the condition which has occurred in FIG. 1. It will be noted that in this figure the prop rod 14 is in almost a horizontal position.

Figure 3:
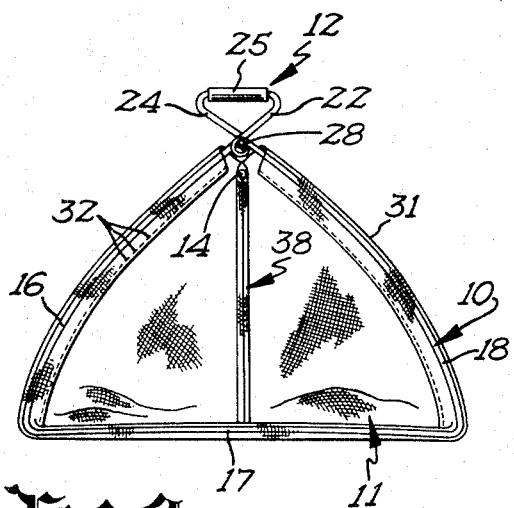
FIG. 3 is a front elevational view with the receptacle substantially empty as in FIG. 2.
Figure 5:
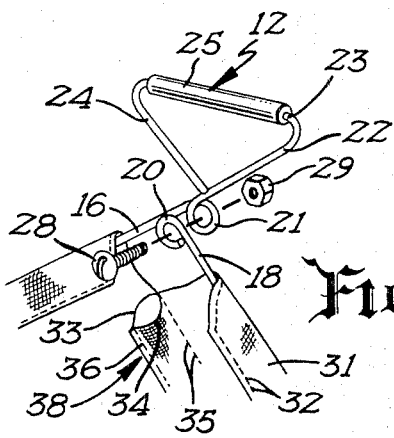
FIG. 5 is a fragmentary, perspective, exploded view showing the manner in which the elements of the frame are held in the position in which they assume when the receptacle is in use.

Referring in more detail to the construction of the bag and frame, it will be noted from FIGS. 1, 3 and 5 that the frame 10 has three sections 16, 17 and 18 all formed of a rod material. Sections 16 and 18 both are bent adjacent their upper ends to form loops. In the case of section 18, the loop is indicated by the reference numeral 20 and is the terminal portion of the rod section 18. In the case of section 16, the rod is bent to form a loop 21 and a continuation of the rod section is bent to form the handle 12 previously referred to. This handle is formed of three continuous sections 22, 23 and 24 disposed in a triangular fashion. The intermediate section 23 has secured thereon a handle member 25 of such shape and material as to enable it to be comfortable to the hand when grasped.

Figure 6:
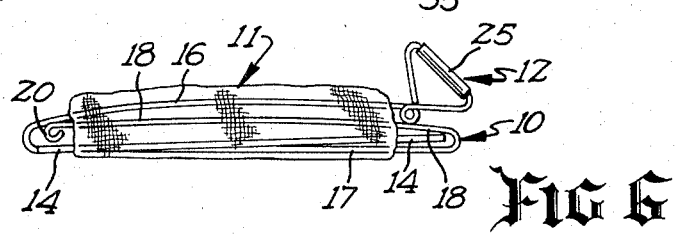
FIG. 6 is a view showing the receptacle in folded position.

The frame section 10 is formed of rod material which is sufficiently rigid that when it is assembled as shown in FIGS. 1-4, it will retain its shape. At the same time, it is sufficiently bendable that sections 16 and 18 can be folded downwardly with respect to section 17 as shown in FIG. 6. When the sections 16 and 18 are bent outwardly with respect to section 17 as shown in FIGS. 1 and 3, they are retained in the proper relative position by a nut and bolt which passes through the loops 20 and 21 formed at the ends of sections 18 and 16 respectively. This is best shown in FIG. 5 in which the reference numeral 28 designates a bolt and reference numeral 29 a nut. As shown in the exploded view of FIG. 5, the bolt 28 passes through the loops 20 and 21 and is effective when the nut 29 is secured thereto to clamp these loop members 20 and 21 together holding sections 16 and 18 of the frame in the position shown in FIGS. 1 and 3. Sections 16, 17 and 18 are shown as slightly arcuate, sections 16 and 18 being bowed outwardly and section 17 being bowed upwardly. This is desirable from several standpoints. In the first place, the outward bowing of sections 16 and 18 decreases the angle between the adjacent portions of these sections and base section 17 and increases the size of the opening framed by sections 16, 17 and 18. The upward bowing of base section 17 results in the frame being more stable on uneven ground since the primary points of engagement between the frame and the ground is adjacent the outer ends of base section 17.

The bag 11, as previously referred to, is made out of a light-weight mesh of a plastic material such as nylon. Such a mesh is relatively resistant to tearing and is mildew-proof. In order for these receptacles to be practical, it is necessary for them to be very large. By using light-weight material, the weight of the receptacle can be kept relatively low as compared to its weight if a heavier material such as burlap is employed. The bag 11 is secured to the frame 10 by having a terminal outer portion 31 looped around the frame and stitched thereto as indicated by the dash marks 32. The bag is thus permanently attached to the frame. This does not impede the filling of the frame, however, since the portions of the bag simply bend in with the frame when it is folded.

Figure 2:
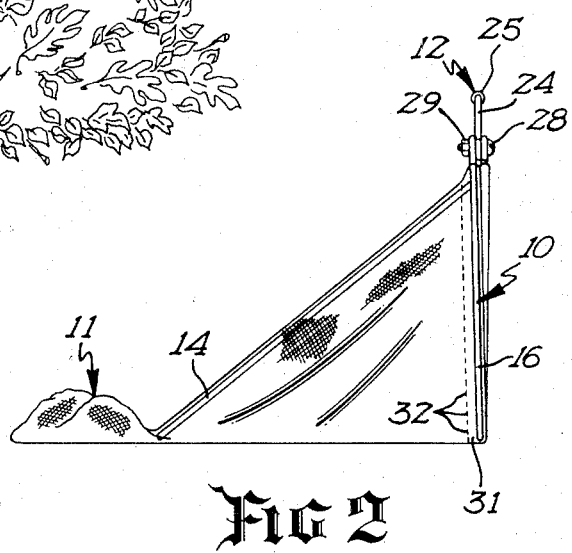
FIG. 2 is a side elevational view with the receptacle empty and showing the manner in which the prop rod holds the opening of the frame in a substantially vertical position.
Figure 4:
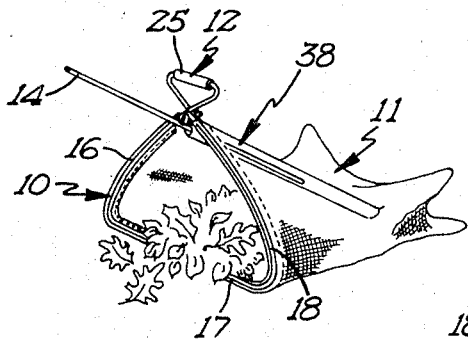
FIG. 4 is a perspective view showing the manner in which the prop rod is inserted into position.

The bag is formed by stitching together adjacent edges of the material extending lengthwise of the bag. As best shown in FIG. 5, the two inner portions 33 and 34 of the bag material are stitched together along spaced lines 35 and 36 to hold the bag together and to provide a sleeve 38 between the stitched lines 35 and 36. As best shown in FIG. 2, this sleeve is of a length substantially corresponding to that of the prop rod 14. The sleeve may be closed at its inner end either by a cross stitch or by having the stitching lines 35 and 36 converge. As best shown in FIG. 5, the sleeve 38 is open at its outer end to permit insertion of the prop rod 14 as best shown in FIG. 4. The sleeve 38 acts to form a hinge between the prop rod 14 and the frame 10. It is possible to provide a metal hinge between the prop rod 14 and the frame 10. The present arrangement is, however, simpler and guards against any binding that might occur between the rod 14 and the frame 10 as the hinge became clogged with debris.

In use, the frame is assembled, as previously described, with the sections 16 and 18 being held together by bolt 28 and nut 29. The prop rod 14 is inserted into the sleeve 38 and the inner end of the prop rod 14 is allowed to drop on the ground as shown in FIGS. 2 and 3. With the rod in this position, the frame 10 tends to be held in a substantially vertical position so as to permit ready access to the interior of the bag 11. It is now possible readily to rake leaves, lawn clippings or the like into the bag. As the bag 11 begins to be filled, rod 14 is raised. As previously pointed out, this does not, however, cause frame 10 to fall over since the lower end of the prop rod 14 now rests on the leaves in the bag instead of on the ground. As the bag is progressively filled, the prop rod 14 is raised in position until it assumes the position shown in FIG. 1. In this position, the entire receptacle is self-supporting without the aid of rod 14 because of the bag 11 being filled with leaves.

When the bag 11 is full, it is unnecessary to do anything more than to grab the handle 12. It is preferable to pull the handle back away from the base section 17 so as to tend to bring the frame 10 to an uppermost position. When this happens, the base section 17 of the frame 10 tends to close the upper end of the sack and the sack can be readily dragged to the point where it is desired to dispose of the contents of the sack. This point may be a compost heap or a shredder, as previously referred to.

It can readily be seen from the above description that the receptacle of my invention requires very little effort to maintain the opening of the frame in a vertical position. Regardless of the condition of the soil, it is possible to set the frame up quickly by the use of the prop rod. This prop rod furthermore does not impede the filling of the bag. When the bag is filled, the frame can simply be lifted with no interference by the prop rod. When it is desired to store the unit, the receptacle can be picked up by the handle and hung on a wall. Since the bag and the prop rod, under these conditions, drop down to a position generally parallel to the frame, the receptacle will be relatively flat against the wall. If it is desired to store the unit in a more compact fashion, it is possible by the removal of a single nut and bolt and the partial removal of the prop rod to fold up the unit into a relatively compact bundle. After the frame is folded, the bag can be wrapped around the frame, forming a very compact device.

While I have shown a specific embodiment of my invention for purposes of illustration, it is to be understood that the scope of the invention is limited solely by the appended claims.

I claim as my invention:

1. A self supporting receptacle for collecting lawn debris comprising
  a frame formed of rod material and having at least three sections normally angularly disposed with respect to each other to define a framed opening, a bag having an opening whose peripheral length substantially corresponds with the peripheral length of said framed opening of said frame and having means for securing said frame to the opening of said bag, a rod having a length greater than the vertical height of said framed opening, and means for movably securing said rod with respect to said frame with one end of said rod adjacent to an upper portion of said frame and with the rod extending inwardly from said upper portion, said rod acting as a prop when said bag is substantially empty to support said frame and hence the opening of said bag in a position sufficiently close to a vertical position to enable lawn debris to be readily introduced therein without lifting of the debris.

2. The receptacle of claim 1 in which said bag has a sleeve extending lengthwise thereof and in which said rod is movably supported with respect to said frame by being disposed in said sleeve.

3. The receptacle of claim 2 in which said sleeve is closed at its inner end and has an open end adjacent the opening of the bag.

4. The receptacle of claim 1 in which said frame has three sections disposed so as to define a triangular opening with the base of the triangle designed to rest on the ground.

5. The receptacle of claim 4 in which one of the sections of the frame is formed to provide a handle for manipulation of the receptacle.

6. The receptacle of claim 1 in which said sections are bendable with respect to each other to enable said frame to be folded for storage purposes.

7. The receptacle of claim 1 in which said bag is formed of a lightweight mesh of a plastic material which tends to resist mildew.

8. The receptacle of claim 1 in which said frame has three sections disposed so as to define a triangular opening with the base of the triangle designed to rest on the ground, in which said bag has a sleeve extending lengthwise and terminating at its upper end near the upper corner of the triangle, and in which said rod is movably supported with respect to said frame by being disposed in said sleeve.

9. The receptacle of claim 4 in which the side sections of the frame are bowed outwardly.

* * * * *